(12) United States Patent
Schoenblum

(10) Patent No.: US 7,155,532 B2
(45) Date of Patent: Dec. 26, 2006

(54) TRANSMITTING STREAMS OVER ASYNCHRONOUS NETWORKS

(75) Inventor: Joel W. Schoenblum, Alpharetta, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 902 days.

(21) Appl. No.: 10/336,821

(22) Filed: Jan. 3, 2003

(65) Prior Publication Data

US 2003/0133446 A1 Jul. 17, 2003

Related U.S. Application Data

(60) Provisional application No. 60/345,388, filed on Jan. 4, 2002.

(51) Int. Cl.
*G06F 15/173* (2006.01)
*H04L 12/56* (2006.01)

(52) U.S. Cl. ........................... 709/231

(58) Field of Classification Search ......... 709/231, 709/236, 246, 247
See application file for complete search history.

(56) References Cited

U.S. PATENT DOCUMENTS

| | | | | |
|---|---|---|---|---|
| 5,742,599 A | | 4/1998 | Lin et al. | 370/395 |
| 5,742,604 A | | 4/1998 | Edsall et al. | 370/401 |
| 6,038,232 A | | 3/2000 | Jung et al. | 370/395 |
| 6,144,641 A | * | 11/2000 | Kaplan et al. | 370/238 |
| 6,233,226 B1 | | 5/2001 | Gringeri et al. | 370/252 |
| 6,233,256 B1 | | 5/2001 | Dieterich et al. | 370/506 |
| 6,317,462 B1 | | 11/2001 | Boyce | 375/240.27 |
| 6,473,404 B1 | * | 10/2002 | Kaplan et al. | 370/238 |
| 6,490,705 B1 | | 12/2002 | Boyce | 714/776 |
| 6,522,651 B1 | | 2/2003 | Herrmann | 370/395.2 |
| 6,684,273 B1 | * | 1/2004 | Boulandet et al. | 710/52 |
| 6,687,251 B1 | * | 2/2004 | Mousseau et al. | 370/401 |
| 6,785,261 B1 | * | 8/2004 | Schuster et al. | 370/352 |
| 7,039,048 B1 | * | 5/2006 | Monta et al. | 370/389 |

OTHER PUBLICATIONS

"AMISP: A Complete Content-Based MPEG-2 Error-Resilient Scheme," P. Frossard and O. Verscheure, IEEE Transactions on Circuits and Systems for Video Technology, vol. 11, Issue 9, Sep. 2001, pp. 989-998.

"Transport of MPEG-4 over IP/RTP," A. Basso and S. Varakliotis, 2000 IEEE International Conference on Multimedia and Expo 2000, ICME 2000, vol. 2, 2000, pp. 1067-1070.

"Packet Coding Schemes for MPEG Video over Internet and Wireless Networks," H. Zheng and J. Boyce, Wireless Communications and Networking Conference, 2000. WCNC. 2000 IEEE, vol. 1, 2000, pp. 191-195.

"Providing Multicast Video on Demand Using Native-Mode Asynchronous Transfer Mode," J.W. Lockwood, S.M. Kang, A. Hossain, J. Hiltenbrant, Proceedings of the 1998 IEEE International Symposium on Circuits and Systems, 1998. ISCAS 1998, vol. 4, May 31-Jun. 3, 1998, pp. 53-56.

"An experimental study for transmitting MPEG-2 streams over ATM networks," F. Meylan, L.G.G. Kiatake, M.Z. Santos, S.T. Kofuji, and J.P. Courtiat, 1998 1st IEEE International Conference on ATM, 1998. ACATM-98, Jun. 22-24, 1998, pp. 114-122.

(Continued)

*Primary Examiner*—David Y. Eng

(57) ABSTRACT

An asynchronous network stream transmitter receives a transport stream having content packets and packets to be filtered out and is adapted to selectively encapsulate content packets into network frames.

47 Claims, 8 Drawing Sheets

OTHER PUBLICATIONS

"Quality of Service Issues for MPEG-2 Video Over ATM," M.J. Riley and I.E.G. Richardson, International Broadcasting Convention (Conf. Publ. No. 428), Sep. 12-16, 1996, pp. 583-587.

"MPEG-2 over ATM: System Design Issues," S. Varma, Compcon 1996, "Technologies for the Information Superhighway" Digest of Papers, Feb. 25-28, 1996, pp. 26-31.

"Packing Scheme for Layered Coding MPEG-2 Video Transmission Over ATM Based Networks," P. Cuenca, L. Orozco-Barbosa, L. Wang, A. Garrido and F. Quiles, IEEE ATM Workshop 1997, Proceedings, May 25-28, 1997, pp. 168-177.

"Comparison and Evaluation of Packing Schemes for MPEG-2 over ATM using AAL5," I.F. Akyildiz, S. Hrastar, H. Uzunalioglu, W. Yen, 1996 IEEE International Conference on Communications, 1996. ICC 96, Conference Record, Converging Technologies for Tomorrow's Applications, vol. 3, Jun. 23-27, 1996, pp. 1411-1415.

Network Working Group RFC 2250: RTP Payload Format for MPEG1/MPEG2 Video, Hoffman et al., The Internet Society, Jan. 1998, pp. 1-16.

* cited by examiner

TRANSMITTING STREAMS OVER ASYNCHRONOUS NETWORKS

CROSS-REFERENCE TO RELATED APPLICATION

This application claims priority to co-pending U.S. provisional application entitled, "A DEVICE FOR TRANSCEIVING MPEG-2 TRANSPORT STREAMS OVER IP NETWORKS," having Ser. No. 60/345,388, filed Jan. 4, 2002, which is entirely incorporated herein by reference.

This application is related to co-pending U.S. patent application Ser. No. 10/336,593 entitled "RECEIVING STREAMS OVER ASYNCHRONOUS NETWORKS," which is being filed on the same date as the present application having the same inventor and is entirely incorporated herein by reference.

TECHNICAL FIELD

The present invention is generally related to transceivers in a broadband communication system and, more particularly, is related to an apparatus and method for transmitting transport streams over asynchronous networks.

BACKGROUND OF THE INVENTION

A conventional subscriber television system provides programming in a digital format such as MPEG-2, which is an established standard for the compression of audio and video information. The distribution mechanisms employed by a conventional subscriber televisions system include satellite, terrestrial and cable communications networks. A relative newcomer for the distribution of digital program material is the broadband packet-switching network.

The broadband packet-switching network and the television network worlds have traditionally been distinct and separated by a wide gap technologically. The distribution and broadcast of television content has been traditionally a one-way technology, with a high reliability of service. By contrast, packet-switching networks are full duplex and were not originally designed to offer high reliability or Quality of Service (QoS).

An example of a packet-switching network is an Internet Protocol (IP) network, which is a "connectionless" network. In connectionless network, no connections or paths are established prior to a source being able to communicate with a destination. Instead, a packet switcher or router forwards each packet based on a path or route that is dynamically determined at the time the packet switch or router receives the packet. Consequently in packet-switching networks, each packet transmitted from the source to the destination may follow a different path through the network. Due to different delays from following different paths, the packets in a packet-switching network may arrive at the destination in a completely different order than they were transmitted by the source.

A need exists to bridge the gap between the television distribution technology and packet-switch network technology. Digital program streams are synchronous streams that are normally played out from a digital encoder or multiplexer in an industry standard format known as Digital Video Broadcast/Asynchronous Serial Interface (DVB/ASI). Thus, what is sought is an apparatus and method for carrying a transport stream over a packet-switch network and re-transmitting the transport stream. What is also sought is an apparatus and method for receiving a variably delayed stream of network frames transmitted through a packet-switch network and playing out a synchronous stream of transport packets, wherein the transport packets were carried in the network frame stream. Furthermore, what is sought is an apparatus and method for receiving a transport stream and selectively including content of the transport stream in network frames for transmission over a packet-switching network.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Generally speaking, preferred embodiments of the present invention include encapsulation of content by filtering out and replacing null packets, and in some embodiments, dropped program packets, with an indication of a number of filtered out packets. Accordingly, new transmitters, receivers, and systems, and associated methods are included within the scope of the present invention.

Figure 1:
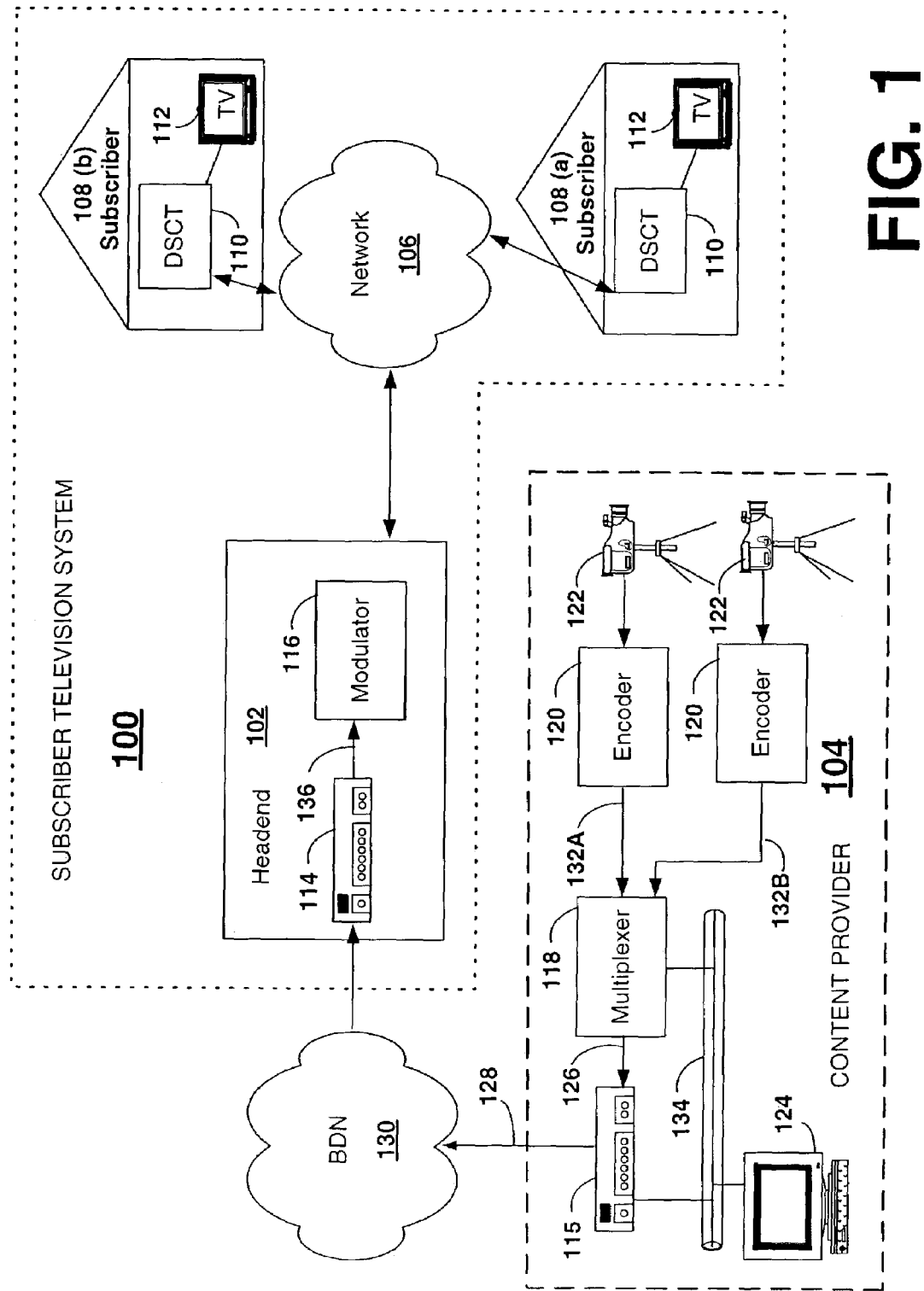
FIG. 1 is a block diagram of a broadband communications system, such as a subscriber television system, in which the preferred embodiment of the present invention may be employed.

Referring to FIG. 1, a subscriber television system 100 includes a headend 102, a distribution network 106, a plurality of digital subscriber communication terminals (DSCTs) 110, which are located at remote subscriber locations 108. The DSCTs 110 provide a two-way interface for subscribers to communicate with the headend 102. Typically, the DSCTs are coupled to a display device such as a television 112 for displaying programming and services transmitted from the headend 102. Those skilled in the art will appreciate that in alternative embodiments the equipment for decoding and further processing the signal can be located in a variety of equipment, including, but not limited to, a DSCT, a computer, a TV, a monitor, or an MPEG decoder, among others.

The headend 102 includes an asynchronous-stream-receiver (ASR) 114 and a modulator 116, as well as well known elements, such as, a digital network control system (not shown), and servers such as a video-on-demand (VOD)

server (not shown. The ASR 114 is adapted to receive transport streams such as, but not limited to, MPEG transport streams carried in network frames such as Ethernet frames and transmit, at least indirectly, the transport stream 136 to the modulator 116. The modulator 116 frequency modulates the transport stream 136 using techniques well known to those skilled in the art such as, but not limited to, Quadrature amplitude modulation (QAM), and transmits the modulated transport stream over the network 106 to the subscriber premises 108.

The headend 102 receives content from sources such as content providers 104 via a broadband distribution network (BDN) 130, which is typically an IP network known to those skilled in the art. The content provider 104 uses, among other things, an asynchronous-stream-transmitter (AST) 115, a multiplexer 118, and a control system 124 to provide programming to the STS 100. The multiplexer 118 receives a plurality of transport streams 132 from a plurality of encoders 120 and combines the transport streams 132 into a multiplexed transport stream 126. Each one of the encoders 120 receives a signal from a camera 122 or other source (not shown) and converts the signal into a digital format such as an MPEG format.

The control system 124 is in communication with the multiplexer 118 and the AST 115 via communication link 134. Among other things, the control system 124 provides an operator interface to the AST 115 for issuing commands such as "Drop Program" to the AST 115. Details of seamless program dropping are provided hereinbelow.

The AST 115 receives the synchronous transport stream 126 and transmits an asynchronous stream 128 of network frames. The AST 115 is adapted to receive the transport stream 126 and selectively encapsulate transport packets in network frames and transmit the network frames over the BDN 130 to the ASR 114, which de-encapsulates the network frames and transmits the synchronous transport stream 136. In one embodiment, the AST 115 is adapted to receive Drop Program messages from the system controller 124 and responsive thereto, seamlessly drop a specified program from the network stream 128. In another embodiment, the ASR 114 and the AST 115 are configured symmetrically such that both of them can: (1) receive an asynchronous stream of network frames and transmit a synchronous stream of transport packets; and (2) receive a synchronous stream of transport packets and transmit an asynchronous stream of network frames.

For the purposes of this disclosure we shall consider a transport stream received by the AST 115 to consist of null packets and non-null packets, which will be referred to as content packets. Typically, content packets include packets that carry portions of programming, system information, or other information. A null packet is generally considered to a meaningless packet, i.e., one used as filler in the transport stream, with stuffing packets being one example in an MPEG transport stream. In one preferred embodiment of the present invention, null packets are filtered out and replaced by stream information that indicates the number of filtered out null packets. Besides null packets, other packets that can be selectively filtered out include any packet that is selectively not transmitted across the BDN 130, examples of which include packets carrying dropped programs.

A transport stream transmitted by the ASR 114 includes replacement transport packets and content packets, which received through the BDN 130. Replacement transport packets are packets generated by the ASR 114 and transmitted therefrom in a transport stream. Like a null packet, a replacement transport packet is one whose content may be ignored, and is used as filler in the resulting transport stream. When the transport stream transmitted by the ASR 114 is an MPEG stream, the replacement transport packet is a stuffing packet.

In one preferred embodiment, the AST 115 selectively encapsulates content packets into network frames and transmits the network frames, along with stream information, to the ASR 114, and the ASR 114 uses the stream information, and other information, and the network frames to transmit a synchronous transport stream, which includes the content packets carried by the network frames. As long as the AST 115 has not dropped a program, the sequence of transport packets in transport stream 136 is preferably essentially identical to the sequence of transport packets in transport stream 126. However, if the AST 115 has dropped a program, the sequence of transport packets in stream 136 will be similar to the sequence of transport packets in stream 126 except that in stream 136 the content packets of the dropped program are replaced by replacement transport packets.

In one preferred embodiment, the ASR 114 and the AST 115 are also adapted to correct for transmission errors in the network frame stream. In one embodiment, the network frames are User Datagram Packets (UDP), which are well known to those skilled in the art. UDP packets are transmitted through the BDN 130 using connectionless protocols, and unlike other protocols such as TCP/IP, UDP provides no automatic repeat request (ARQ) mechanisms. In a conventional network, once a UDP packet was dropped by the network there was no mechanism for recovering dropped packets. However, in this embodiment of the invention, packet level forward/error/correction (FEC) is implemented by the ASR 114 and the AST 115 114 to recover dropped packets.

Figure 2:
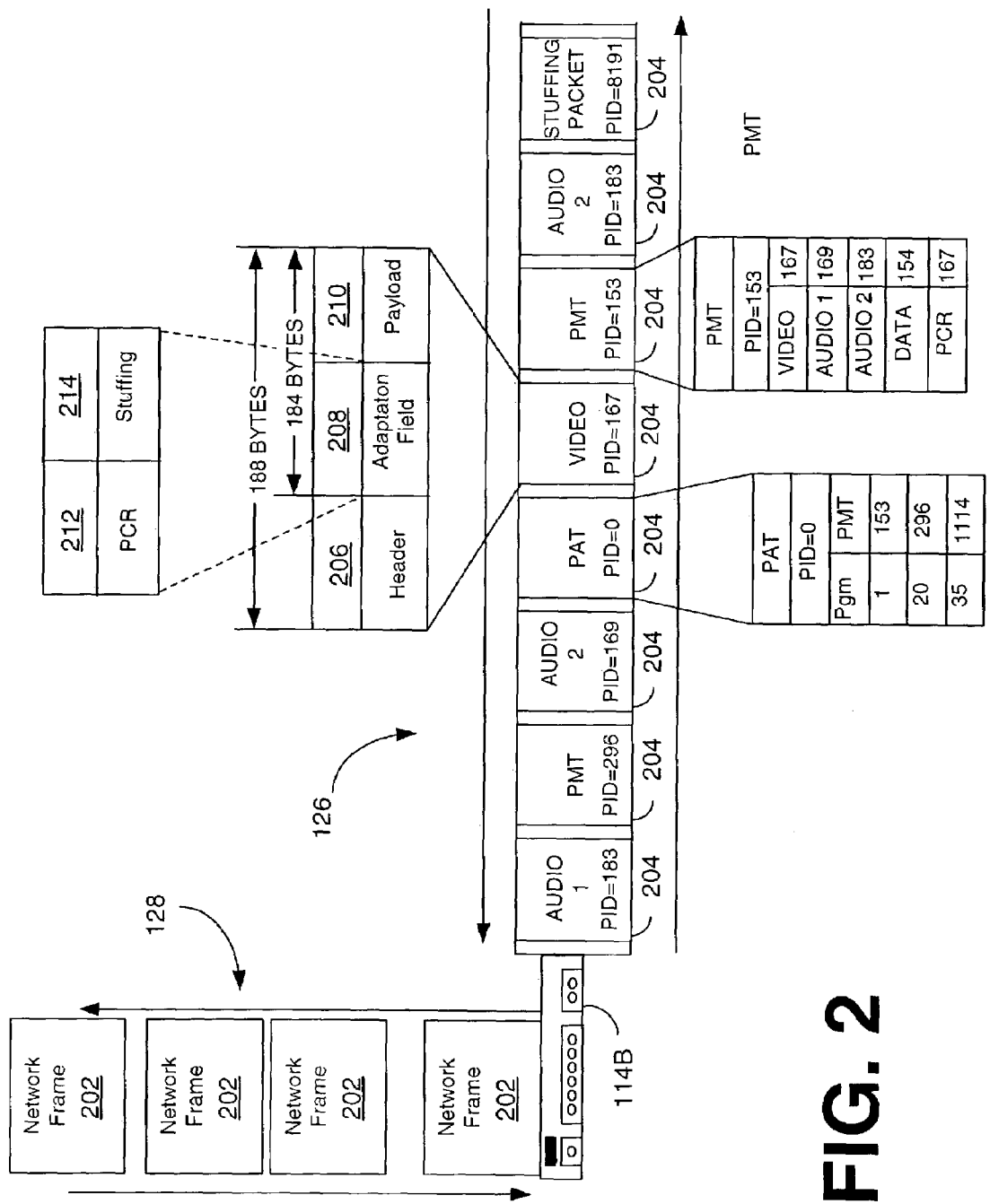
FIG. 2 is block diagram of an MPEG transport stream.

Referring to FIG. 2, in the preferred embodiment, the AST 115 is adapted to receive a stream 126 of transport packets 204 and transmit a stream 128 of network frames 202 and vice-a-versa. For the purposes of clarity, the stream 126 of transport packets 204 is described in terms of an MPEG stream but this is for exemplary purposes only and should not be construed as a limitation of the present invention. Similarly, the network frames 202 are described as UDP packets, which may be further encapsulated using network protocols such as IP or Ethernet, but this description is also for exemplary purposes only and should not be construed as a limitation of the present invention.

A brief description of MPEG packets are provided hereinbelow, but further details are provided in the MPEG-1 standards (ISO/IEC 11172), the MPEG-2 standards (ISO/IEC 13818) and the MPEG-4 standards (ISO/IEC 14496) are described in detail in the International Organization for Standardization document ISO/IEC JTC1/SC29/WG11 N (June 1996 for MPEG-1, July 1996 for MPEG-2, and October 1998 for MPEG-4), which are hereby incorporated by reference.

Briefly described, an MPEG transport packet 204 is of fixed size, 188 bytes, and it includes a header 206, which is 4 bytes in size and which includes, among other things, a packet identifier (PID) field. The PID field is a 13-bit field that is used to identify streams of packets. PID values range from 0 to 8,191, inclusive. In the STS 100, some PID values are reserved for, among other things, system specific information tables. For example, the PID "0" is reserved for program association tables (PATs) and the PID value 1 is reserved for Conditional Access Tables (CATs). Similarly, the PID value 8,191 is reserved for stuffing packets.

MPEG packets 204 also include an adaptation field 208 and a payload 210. The adaptation field 208 and payload 210 are separately variable in length, but the aggregate length is 184 bytes. The header 206 also includes an adaptation size field that indicates the size of the adaptation field 208. In most MPEG packets 204, the size of the adaptation field 208 is zero bytes. However, when the adaptation field 208 is not zero bytes in size, it is used for, among other things, carrying stuffing 214, when the size of the payload 210 is less than 184 bytes, and for carrying timing information, program clock reference (PCR) 212.

Typically the payload 210 is a portion of a digital service, or a table, or a portion of a table, or other system information. When the payload 210 carries a portion of a digital service, the portion of the digital service is encrypted. Only legitimate subscribers of the STS 100 that have the necessary entitlements and keys for decrypting the payload 210 can access the service. Selected services such as non-premium television programming or other programming can be carried without being encrypted.

System information such as, but not limited to, tables and messages are also carried in the payload 210 of the MPEG packet 204 and are typically carried without encryption. Among other things, system information includes PATs, Program Map Tables (PMTs), and Entitlement Control Messages (ECMs). The PAT associates digital services carried by the transport stream 126 with PMTs. For example, a given digital service, program 1 is associated with the PMT having PID 153 and a different service, program 20, is associated with the PMT having the PID 296.

The PMT associates elementary streams of a given service to their respective PID values. For example, a given service is identified in the PAT as program 1, and the PMT for that program has the PID 153. In this example, the given service is a movie or a television program or a video service that is made up of various elementary streams of content such as video, audio 1, audio 2, etc., where the different audio streams carry audio tracts of the service in different languages. Thus, MPEG packets 204 having the PID 167 carry the video stream for the given service, and the MPEG packets 204 having the PID 169 carry audio tract 1 for the given service. It should be noted that the PID values are uniquely assigned such that no two elementary streams of different services, or the same service, would have the same PID value. The PMT denoted by PID 153 also associates entitlement control messages (ECM) to a packet having the PID 154 and associates the PCRs of the program to packets having the PID 167.

When a subscriber requests a program, the DSCT 10 extracts the PAT (PID=0) from the transport stream and determines the PMT for that program. The DSCT then uses the PMT for the program to determine the PID streams of the program including the PCR PID stream and ECM PID stream. The DSCT 110 determines whether appropriate entitlements have been granted such that the program can be decrypted and displayed to the subscriber. If entitlement has been granted, the DSCT 110 uses the ECMs in decrypting the program.

The PCR 212 is a field having a timestamp of the local time of the encoder when the field was stamped. MPEG standards require that the encoder insert a PCR in a PID stream every 100 ms or less so that the DSCT 10 or MPEG decoder that receives the program can match its internal clock (not shown) to the internal clock of the MPEG encoder 120. Without the PCRs, the internal clock of the DSCT 110 would drift, and then the DSCT 110 would not be able to synchronize the various PID streams of the program for display. Thus, it is important that the DSCT 110 receive a jitter free transport stream. In other words, that the time difference between consecutive PCRs correspond to the time difference of their arrival at the DSCT 110, within some operating tolerance.

Lastly, stuffing packets are space fillers in a transport stream. When the DSCT 110 receives a stuffing packet, the DSCT 110 ignores them because the payload 210 of a stuffing packet typically consists of all 1' or 0's and is meaningless to the DSCT 110.

Figure 3A:
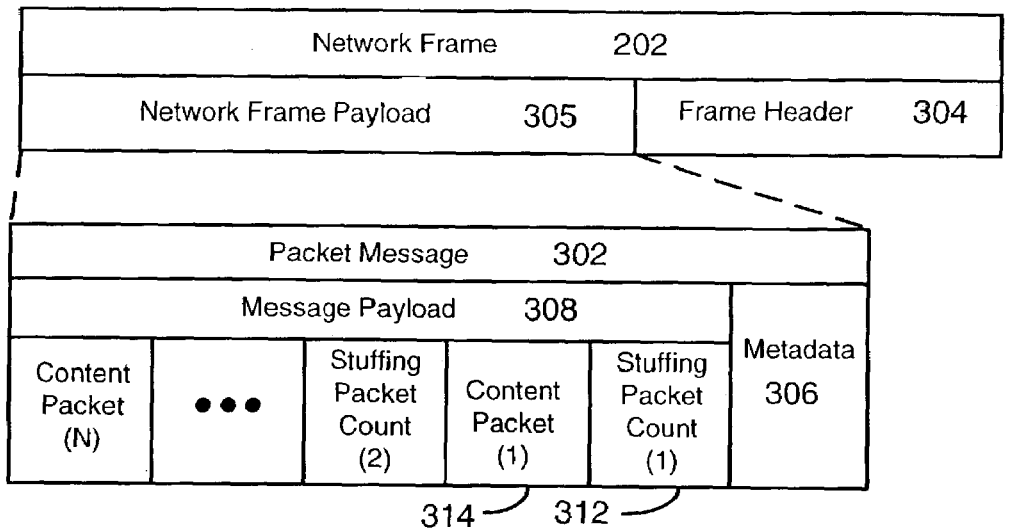
FIGS. 3A–3C are block diagrams of messages generated by an AST.
Figure 3B:
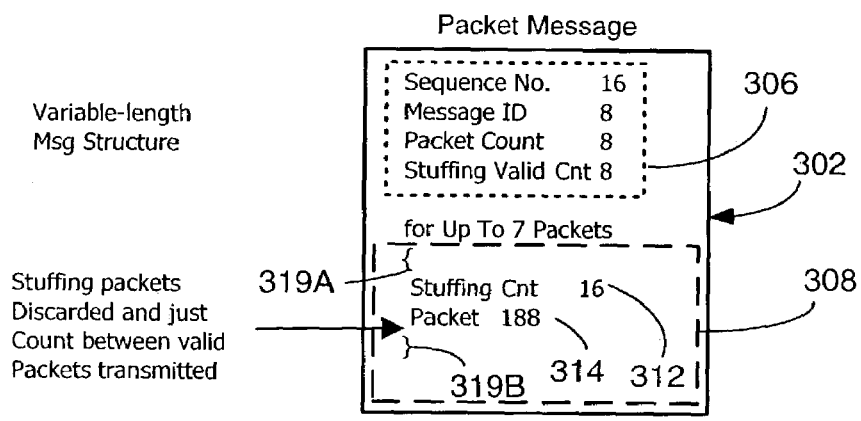
Figure 3C:
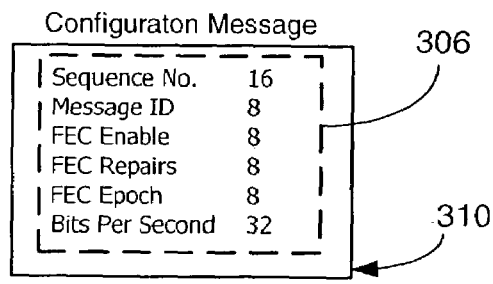

Referring to FIGS. 3A–3C, a network frame 202 includes frame header 304 and a network frame payload 305, which is the content that the network frame 202 encapsulates. The frame header 304 includes sender and recipient information and other networking information known to those skilled in the art. In addition to sender and recipient addresses, the frame header 304 includes frame sequence information and interleaving information. The frame sequence information is a field that is incremented each time a new network frame 202 is created. For UDP packets, the value of the frame sequence information rolls from zero to 65,535. The interleaving information includes both epoch and interleave sequence number, which will be explained in detail hereinbelow.

Possible network frame payloads 305 include a packet message 302, which is illustrated in FIGS. 3A and 3B, and a configuration message 310, which is illustrated in FIG. 3C. In FIG. 3A the network frame payload 305 is a packet message 302. However, when a configuration message 310 is transmitted, the configuration message 310 is carried in the network frame payload 305 instead of the packet message 302.

FIGS. 3B and 3C illustrate the format of packet messages 302 and configuration messages 310, respectively. A packet message 302 includes selected transport packets 204, and a configuration message 310 includes initialization and operation information. The configuration message 310 is first described and then the packet message 302 is described.

Refer to FIG. 3C, the configuration message 310 includes the following metadata:

Sequence Number: 16-bit sequence number which increments by a count of one with each configuration message.

Message ID: 8 bit message I.D. uniquely identifies the message as being a configuration message.

FEC Enable: an 8-bit field indicating whether forward error correction is enabled and if so, indicating the number of packets in a block.

FEC Repairs: an 8-bit field indicating the number of repair packets in a block.

FEC Epoch: an 8-bit field indicating the interleaving of packets of different blocks.

Bits-Per-Second: a 32-bit field that indicates the bit rate of the transport stream.

Referring to FIG. 3B, the packet message 302 includes metadata 306 and a message payload 308. The message payload 308 includes the stuffing count field 312 and the content packet fields 314 and is of variable size depending upon the number of stuffing count field 312 and the content packet fields 314 enclosed by the brackets 319. The metadata 306 includes the following fields:

Sequence Number: 16 bits sequence number which increments by a count of one with each packet message.

Message I.D.: 8-bit message I.D. uniquely identifies the message as being a packet message.

Packet Count: number of transport packets in the packet message.

Stuffing Valid Count: number of valid stuffing counts in the packet message.

The message payload 308 includes stream information for stuffing packets and content packets. In one preferred embodiment, alternating stuffing information and content packets in the message payload 308 carries the stream information. Specifically, the message payload 308 includes a series of alternating fields, which alternate between a stuffing count field 312, which 16 bits in size, and a content packet field 314, which is 188 bytes in size. A stuffing count field 312 indicates the number of stuffing packets interposing consecutive content packets. A content packet field 314 carries a content packet. The alternating stuffing count fields 312 and content packet fields 314 result in sequence information for replicating a set of transport packets. The packet count and the stuffing valid count fields of the metadata 306 determine the length of the payload 308.

In the preferred embodiment, the maximum transferable unit (MTU) governs the length of the payload 308, which for UDP packets over Ethernet is 1.5 kilobytes, as one example. So, the packet message 302 can include a maximum of 7 content packets without exceeding the MTU, when the packet message is encapsulated in a UDP packet carried over Ethernet. However, it should be clear that the size limitation is one of the network and not a limitation of the present invention.

Figure 4:
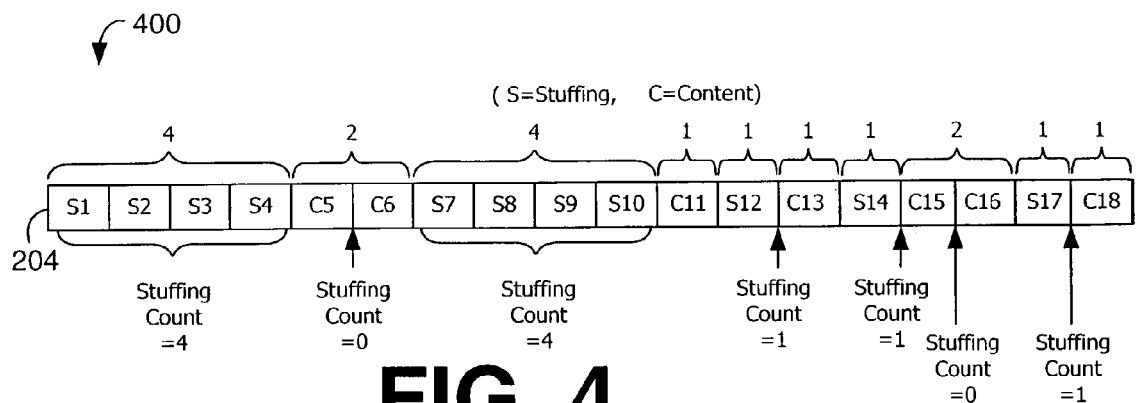
FIG. 4 is a block diagram of a set of transport packets of a transport stream.
Figure 5A:
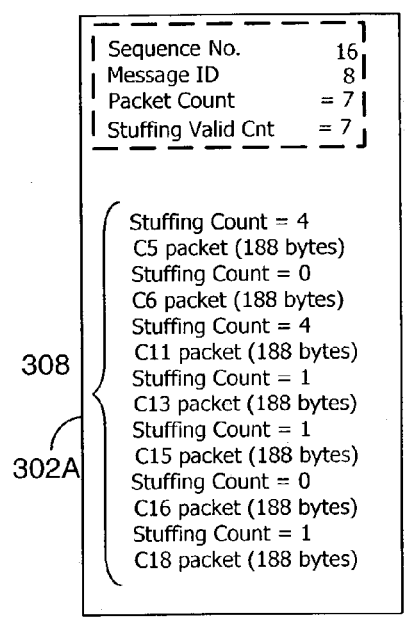
FIGS. 5A and 5B are block diagrams of messages carrying a portion set of transport packets of FIG. 4.
Figure 5B:
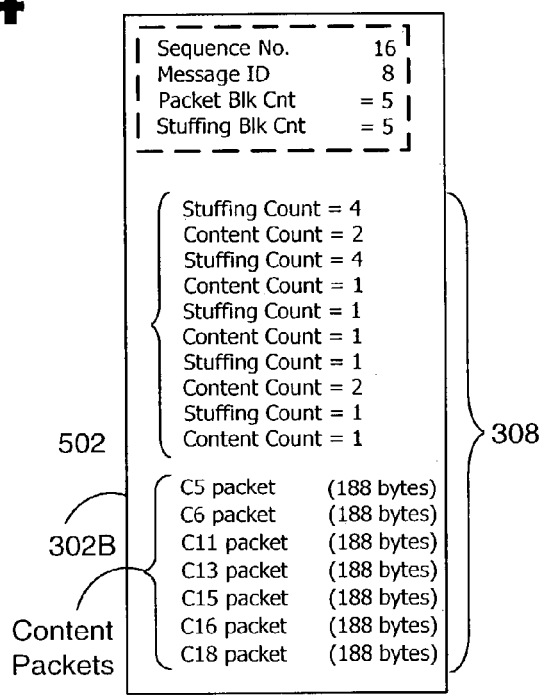

An exemplary set 400 of 18 transport packets 204 are illustrated in FIG. 4, and FIGS. 5A and 5B illustrate two non-limiting examples of packet messages 302A and 302B, respectively, for carrying the information of the set 400 in a UDP packet. In FIG. 4 the stuffing packets are denoted by an "S" and the content packets are denoted by a "C". First a description of how the set 400 is carried in packet message 302A, see FIG. 5A, is provided and then a description of how the set 400 is carried in packet message 302B, see FIG. 5B, is provided.

In packet message 302A, the payload 308 includes both stream information and content. Specifically, preceding a content packet is the number of stuffing packets in the set 400 immediately proceeding that content packet. For example, there are four stuffing packets preceding the first content packet (C5) and zero stuffing packets preceding the second content packet (C6). Thus, the payload 308 includes stuffing count=four, representing the first four stuffing packets, the content packet (C5), stuffing count=zero, representing no stuffing packets interposing the fifth and sixth packets of the set 400, and the content packet (C6) and so on until the seventh content packet (C18) is included in the payload 308. Because there are seven content packets included in the payload 308 the packet count field of metadata 306 is set to seven. Similarly, because there is a stuffing packet count preceding each content packet, the stuffing valid field of metadata 306 is set to seven.

Referring to FIG. 5B, in exemplary packet message 302B, the sequence information 502 is not mixed in with the content packets of the payload 308. Instead, the sequence information precedes the content packets in the payload 308. Here the sequence information 502 represents alternating blocks of stuffing packets and content packets of the set 400. For example, the first block of stuffing packets consists of four packets, the first block of content packets consists of two packets, the second block of stuffing packets consists of four packets, etc. The metadata header 306 includes a packet block count field and a stuffing block count field in which the total number of content blocks and the total number of stuffing blocks are entered, respectively. Thus, for set 400 the packet block count field is set to five and so is the stuffing block count field.

It should be emphasized that the packet messages 302A and 302B are exemplary, non-limiting, embodiments. Those skilled in the art will recognize other methods for providing stream information and content packets, such as but not limited to providing the stream information and content packets in separate messages and all such methods and messages are intended to be within the scope of the present invention. Furthermore, it should be emphasized that the packet messages 302A and 302B can be used to carry a variable number of content packets ranging from zero to a maximum number, which is typically dependent upon the MTU's size, and it should be emphasized that the packet messages 302 can carry stream information for a variable number of stuffing packets.

In addition, it should be noted that the packet messages 302A and 302B can carry stuffing packets that follow the last content packet included in the packet message. For example, assuming that we want to send the first ten stuffing packets of set 400 in the packet message 302A, then in the metadata 306 the packet count would be set to two, the stuffing valid count would be set to three and the payload 308 would consist of: stuffing count=four, content packet (C5), stuffing count=zero, content (C6), and stuffing count=four. Similarly, for packet message 302B, in the metadata 306 the packet block count field would be set to one and the stuffing block count field would be set to two, and the sequence information 502 would be: stuffing count=four, content count=two, stuffing count=four. The payload would then include the content packets (C5) and (C6).

Figure 6:
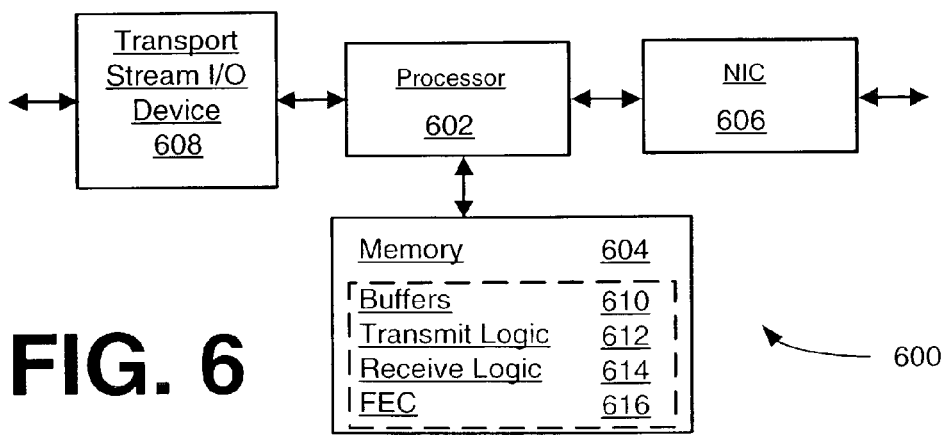
FIG. 6 is a block diagram of components of the AST.

Referring to FIG. 6, which illustrates the embodiment in which the ASR 114 and the AST 115 are configured symmetrically and are referred to hereinafter as an "ASR/AST," an ASR/AST 600 includes a processor 602, a memory 604, a network interface card (NIC) 606, and a transport stream input/output (I/O) device 608. In the preferred embodiment, the processor 602, the memory 604, and the NIC 606 are standard components of a Pentium-based motherboard used in a personal computer, and the transport stream I/O device 608 is a standard PCI DVB/ASI add-in card such as, but not limited to, a Media Pump 533 by Optibase of Mountain View, Calif., or other add-in card known to those skilled in the art. Other embodiments include dedicated implementations as either a transmitter or a receiver, and other embodiments include combining one of those functions with other network elements.

As shown, the memory 604 includes buffers 610, transmit logic 612, receive logic 614 and FEC logic 616. The buffers 610 are working buffers in which transport packets 204 and network frames 202 are buffered during the processing by the processor 602. The processor 602 implements the transmit logic 612 when the ASR/AST 600 is in transmit mode and implements the receive logic 614 when the ASR/AST 600 is in receive mode. The transmit logic 612 includes the logic for selectively encapsulating a set of transport packets 204 into the packet message 302 and encapsulating the packet message 302 and configuration message 310 into a network frame 202. In addition, the transmit logic 612 includes the logic for calculating the bit rate of the received transport stream and the logic for interleaving network frames 204, which is described hereinbelow.

The receive logic 614 includes the logic for configuring the ASR/AST 600 according to the configuration message 310. For example, responsive to a configuration message 310, the processor 602 sets the transmission bit rate of the transport stream I/O device 608 to the bit rate of the configuration message 310. The receive logic 614 also includes the logic for de-interleaving network frames 202 and de-encapsulating the set of transport packets 204 from the packet message 302 of the network frame 202.

The processor 602 implements the FEC logic 616 to forward/error/correct for dropped network frames. In transmit mode, the FEC logic 616 is implemented by the processor 602 to create error correction information which the receive ASR/AST 600 uses in its error correction. In receive mode, the FEC logic 616 is implemented by the processor 602 to use the error correction information for correcting for dropped network frames 202.

In one preferred embodiment, the ASR/AST 600 is configured to serve as either a transmit or receive gateway or function in full duplex manner, essentially serving as a simultaneous transceiver gateway. The functionality of the ASR/AST 600 is described hereinbelow as separate receive and transmit gateways, ASR/AST 600A and ASR/AST 600B, respectively, but this is done for reasons of clarity with the understanding that the ASR/AST 600 can function in either transmit or receive mode.

Figure 7:
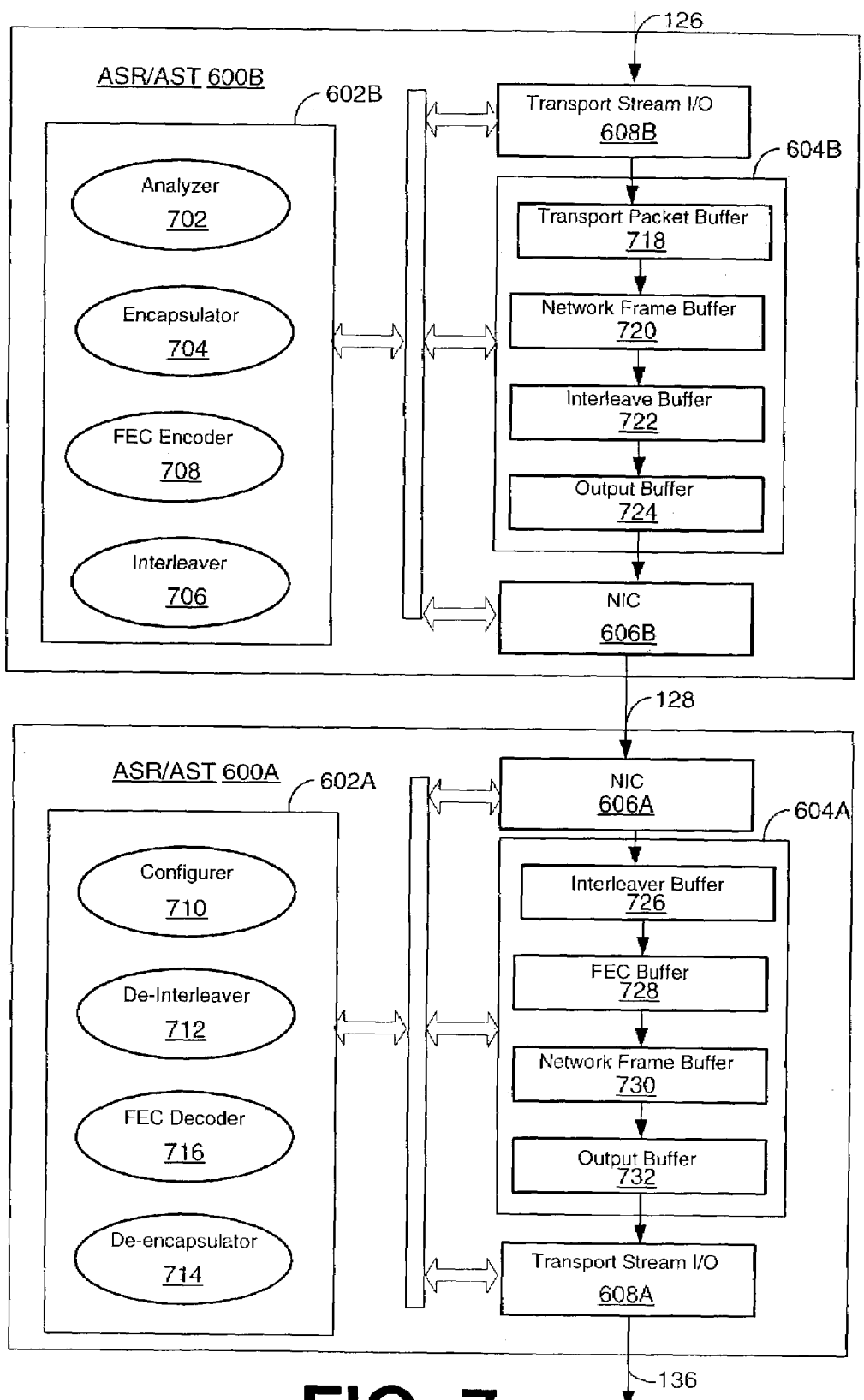
FIG. 7 is a block diagram of components of an ASR and an AST.

In FIG. 7, the ASR/AST 600B is illustrated in transmit mode and the ASR/AST 600A is illustrated in receive mode. In transmit mode, the processor 602B implements the transmit logic 612, which includes an analyzer module 702, an encapsulator module 704, and an interleaver module 706, and the processor implements the FEC logic 616 which includes an FEC encoder module 708. In receive mode, the processor 602A implements receive logic 614, which includes configurer module 710, de-interleaver module 712 and de-encapsulator module 714 and the processor implements FEC logic 616 which includes FEC decoder module 716. The processes of the various modules are generally implemented in parallel or in a predetermined order.

The buffer 610B of memory 604B includes a transport packet buffer 718, a network frame buffer 720, an interleaver buffer 722, an output buffer 724. The buffer 610A of memory 604A includes a de-interleaver buffer 726, an FEC decoder buffer 728, a network frame buffer 730, and an output buffer 732.

The transport stream I/O device 608B receives transport stream 126 and sends the transport packets 204 of the stream to the transport packet buffer 718. The analyzer module 702 monitors the transport packet buffer 718 and, among other things, generates configuration messages 310, which are encapsulated in a network frame 202 and provides the configuration messages to the output buffer 724 for transmission to the ASR/AST 602A by the network interface card 606B.

The analyzer module 702 determines the bit rate of the transport stream 136 from PCR information in the stream, and provides this information in Configuration Messages 306 via network frames 202 over the BDN 130 at regular intervals to the ASR/AST 600A. The purpose in transmitting Configuration Messages is for initialization of the ASR/AST 600A. As will be described hereinbelow, the receive ASR/AST 600A will initialize by listening for a Configuration Message, and will set the output bit rate of its transport stream I/O device 608A to the bit rate contained in the Configuration Message 306. The analyzer 702 determines the bit rate by simply counting the number of bits between consecutive PCRs of the same program and then dividing by the time difference of those PCRs.

Additionally, analyzer 702 determines which transport packets in the stream are desired programs to be transmitted, which packets are stuffing packets, and which packets belong to programs to be seamlessly filtered out of the transport stream 126. The analyzer 702 seamlessly filters programs responsive to Drop Program messages from the control system 124. Where there are programs in the transport stream 126 to be filtered, the analyzer 702 determines the PID streams of those programs using information from the control system 124, or alternatively, the analyzer 702 may use the PAT and PMTs for those programs, which are included in the transport stream 126, to determine the PID streams of those programs. The analyzer re-stamps the PIDs of PID streams that are to be dropped to the PID value of 8,191. Thus, from thereon forward the restamped packets will be treated as stuffing packets. In an alternative embodiment, instead of restamping the PIDs of the PID streams to be dropped, the analyzer 702 keeps track of the PIDs of the dropped streams and processes them as if they were stuffing packets. Thus, for those embodiments, the reference to "stuffing" in FIGS. 3A–5B include stuffing and filtered content packets.

The analyzer 702 extracts sets 400 of transport packets 204 from the transport packet buffer 718 on a first-in, first-out basis and provides the extracted sets of packets to the encapsulator 704. In one preferred embodiment, the analyzer module 702 determines whether there is a predetermined number (N) of content packets in the transport packet buffer 718, and if so, it extracts all intervening packets between the current first-in packet and the Nth content packet, inclusive. The predetermined number is typically the number of content packets that can be carried by a network frame without the network frame exceeding the MTU. The analyzer 702 determines the stream information for that set of packets and provides the content packets of that set of packets and the stream information to the encapsulator 704.

In one embodiment, the present invention enables a variable number of transport packets to be encapsulated, the variable number depending upon the density of stuffing packets in the incoming transport stream. However, the variability of the number of transport packets can be a problem in the flow of network frames because they can be unpredictable and irregular. To counter this problem, in another embodiment, the transport packets are buffered in the transport packet buffer 718 for no longer than a predetermined time delay ($T_B$). When the stuffing packet density in transport stream 126 is low, there will generally be N content packets buffered in the transport packet buffer 718 before the current first-in packet has been buffered longer than $T_B$. In that case, the analyzer module 702 extracts the set of packets as previously described. However, when the stuffing density and transport stream 126 is high, a time longer than $T_B$ can pass between the arrival of the current first-in packet and the Nth content packet. In that case, after a time of $T_B$ from the buffering of the current first-in packet, the analyzer module 702 extracts all of the packets from the transport packet buffer 718 and determines stream information for the extracted set of packets. The stream information and the extracted content packets are then provided to the encapsulator module 704.

In yet another embodiment, instead of defining a time window for encapsulating packets, the analyzer module 702 extracts sets of packets from the transport packet buffer 718 based upon the packet level of the transport packet buffer 718 and based upon the number of content packets in the transport packet buffer 718. In other words, as long as the packet level of the transport packet buffer 718 is below a predetermined threshold and the number of content packets is less than N, the analyzer module 702 does not extract a set of packets from the transport packet buffer 718. But, once either (a) the number of content packets equals N, or (b) the packet level exceeds the predetermined threshold, then in case (a) the set of packets extending between the first-in and the Nth content, inclusive, are extracted; or in case (b) the set of packets extending between the first-in and the packet at the threshold of the transport packet buffer 718 are extracted.

The encapsulator module 704 encapsulates the stream information and the content packets from the analyzer module 702 in payload 308 of the packet message 302 and fills in the fields of the metadata 306. The encapsulator module 704 stamps the frame stream information into the frame header 304. Next, the encapsulator module 704 encapsulates the packet message in a network frame 202, which is then buffered in the network frame buffer 720.

The FEC encoder module 708 removes multiple network frames 202 from the network frame buffer 720, and processes all of the frames at essentially one time. After the FEC encoder module 708 has processed the multiple frames, it passes the multiple frames and the output of the processing to the interleaver module 706.

The interleaver module 706 buffers received network frames in the interleaver buffer 722 and extracts network frames from the interleave buffer 722 such that the network frames are not transmitted in a sequential order. The extracted network frames are then buffered in the output buffer 724. A full description of the interleaver module 706 and the FEC encoder 708 is provided hereinbelow.

The network interface card (NIC) 606B receives network frames from the output buffer 724 and transmits the network frame stream 128 to the ASR/AST 600A. Before describing the ASR/AST 600A, a more complete description of FEC encoder module 708 and the interleaver module 706 are provided.

Figure 8:
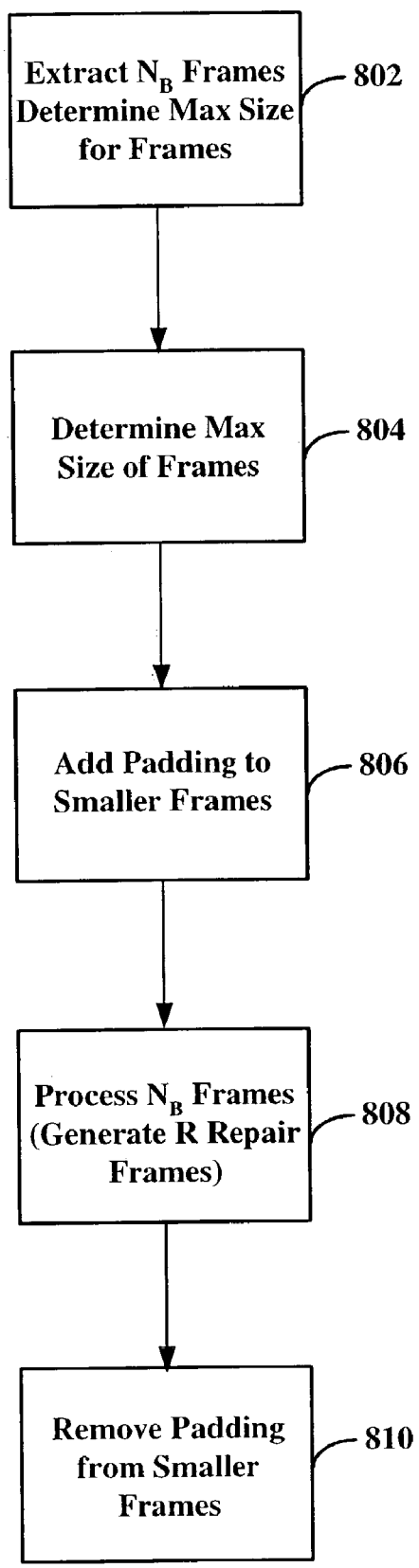
FIG. 8 is a flow chart for logic implemented by a forward error corrector module.

Referring to FIG. 8, the FEC encoder module 708 takes a block of network frames $N_B$ from the network frame buffer 720 and encodes these network frames into an encoded block which consists of $N_B+R$ network frames, where R is an adjustable parameter. The header 304 of the network frame 202 is not encoded. The original block size, $N_B$, is included in the FEC enable field of the metadata 306 of the configuration message 310, and the adjustable parameter R is included in the FEC Repair field of the metadata 306 of the configuration message 310. Setting the repair size R=0 turns off forward error correction. The R frames are called the "repair" frames because they are used by a FEC decoder to generate repair/replacement frames that are dropped during transmission.

Although some embodiments of the present invention generate repair/replacement frames for dropped network packets, in an alternative embodiment, the FEC decoder could also do bit-level FEC. In a conventional system doing packet-level FEC encoding/decoding, the input to the FEC encoder has been a block of data in which each segment of the block is the same size. However, as previously described in one preferred embodiment, the encapsulator module 704 encapsulates a variable number of content packets ranging from none to the predetermined maximum. Thus, network frames 202 buffered in the network frame buffer 720 might not be the same size. Thus, in one preferred embodiment, the FEC encoder module 708 implements the steps illustrated in FIG. 8 to perform FEC on variable sized network frames.

First, in step 802, the FEC encoder module 708 extracts a block of network frames consisting of $N_B$ network frames from the network frame buffer 720. In step 804, the FEC encoder module 708 determines which one (or ones) of the network frames is the largest in size, and in step 806, the FEC encoder module 708 then pads the smaller network frames such that all of the network frames are of equal size.

Next in step 808, the FEC encoder module 708 processes the now equi-sized network frames and generates therefrom the "R" repair frames. The R-repair network frames are the same size as the equi-sized input network frames.

In step 810, the FEC encoder 708 removes the padding from the smaller input network frames such that the size of each one of the network frames of the original block are back to their original size.

When the FEC encoder 708 processes the $N_B$ original frames in step 808, it includes an FEC header in the network frame 202. The FEC header includes an index number, which ranges between 1 and $N_B+R$, inclusive, and denotes the frames position in the $N_B+R$ frames.

As long as an FEC decoder receives at least $N_B$ frames out of the $N_B+R$ frames in the FEC encoded block, the FEC decoder will be able to generate the original $N_B$ frames. The FEC decoder will use as many of the original $N_B$ frames as it receives ($N_B-D$), where D is the number of dropped frames in the first $N_B$ frames, and the decoder will use D repair frames to generate the dropped original frames.

Figure 9:
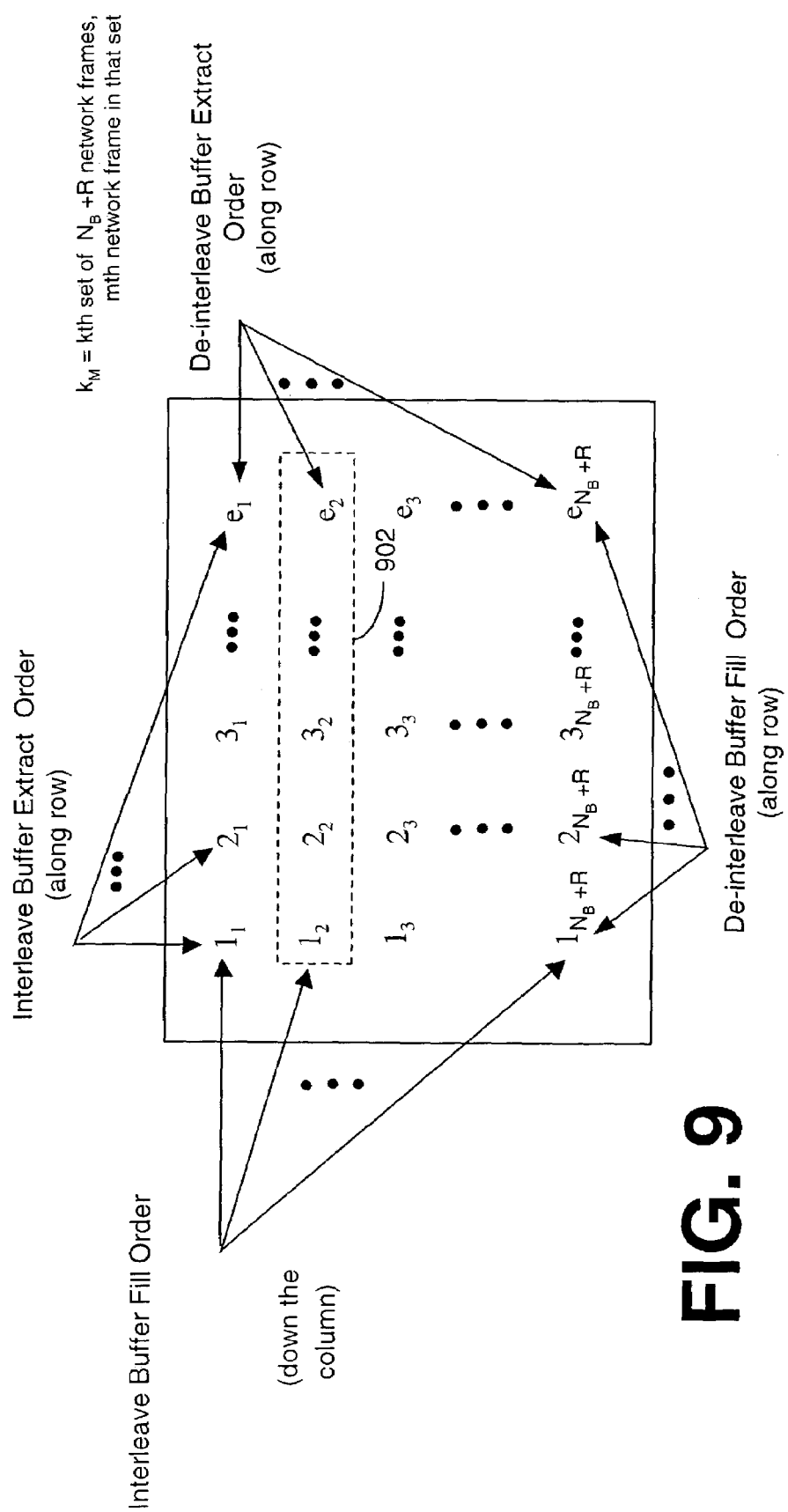
FIG. 9 is a block diagram representing the buffering of network frames in an interleaver buffer.

The FEC encoder 708 passes the encoded block ($N_B+R$) network frames to the interleaver module 706, which then interleaves the network frames of the block with other encoded blocks in the interleaver buffer 722. FIG. 9 illustrates how the interleaver module 706 and de-interleaver module 708 work in their respective buffers 722 and 726. First, we define the number of blocks to be interleaved as an epoch, which is an operator adjustable parameter equal to e. The epoch is provided to the ASR/AST 600A in a configuration message 310.

The interleaver module 706 fills its buffer 722 one column at a time and extracts network frames by rows. The first block of network frames is inserted in the first column, the second block in the second column, and so on, until the $e^{th}$ block is inserted in the $e^{th}$ column, and within a column (or block) the network frames are arranged sequentially from $1-N_B+R$. The first network frame of each of the encoded blocks is extracted and provided to the output buffer 724 before the second network frame of the first network block is extracted. In other words, the network frames represented by $1_1-e_1$ are first extracted and then the network frames represented by $1_2-e_2$ are extracted and so on and so forth. An advantage of interleaving the FEC encoded blocks is that it increases the likelihood that the FEC decoder module 716 can repair damage caused by bursts of dropped network frames. Assume for the moment that we had no interleaving, i.e., e=1, and we dropped x network frames. If x is greater than R, the number of repair frames in an FEC encoded block, then the decoder will not be able to recreate the dropped network frames. However, if we do have interleaving, and the epoch equals "e" and the number of dropped network frames "x" is equal to "e", then we only lose one network frame per block in the event of a burst drop. For example, we might lose the network frames represented by $1_1-e_1$, which are shown in the dashed box 902. Thus, in this example, as long as the number of repair frames (R) is greater than zero, we can correct for all of the dropped packets even though we lost "e" network frames.

Referring back to FIG. 7, network packets buffered in the output buffer 724 are passed to the NIC 606B on a first-in, first-out basis. The NIC 606B transmits the stream of network frames 128, which is an asynchronous stream, to the ASR/AST 600A. The received network frames are buffered in the de-interleaver buffer 726 by the NIC 606A. During initialization, the Configurer 710 empties the packets from the interleaver buffer 726 until it receives a configuration message 310. The Configurer 710 then sets the output bit rate of the transport stream I/O device 608A to the bit rate included in the configuration message, tells the de-interleaver module 712 the size of the epoch, and tells the FEC decoder module 716 the number of network frames ($N_B$) in a block and the number of repair frames (R). The de-interleaver module 712 de-interleaves the network frames and buffers the de-interleaved frames in the FEC buffer 728. The de-interleaver module 712 arranges the received network frames in sequential order. In addition to correcting for the interleaving of the network frames by the interleaver module 706, the de-interleaver module 712 corrects for transmission delays that have caused the network frames to be received in an incorrect order, which is a common problem in packet-switched networks.

Figure 10:
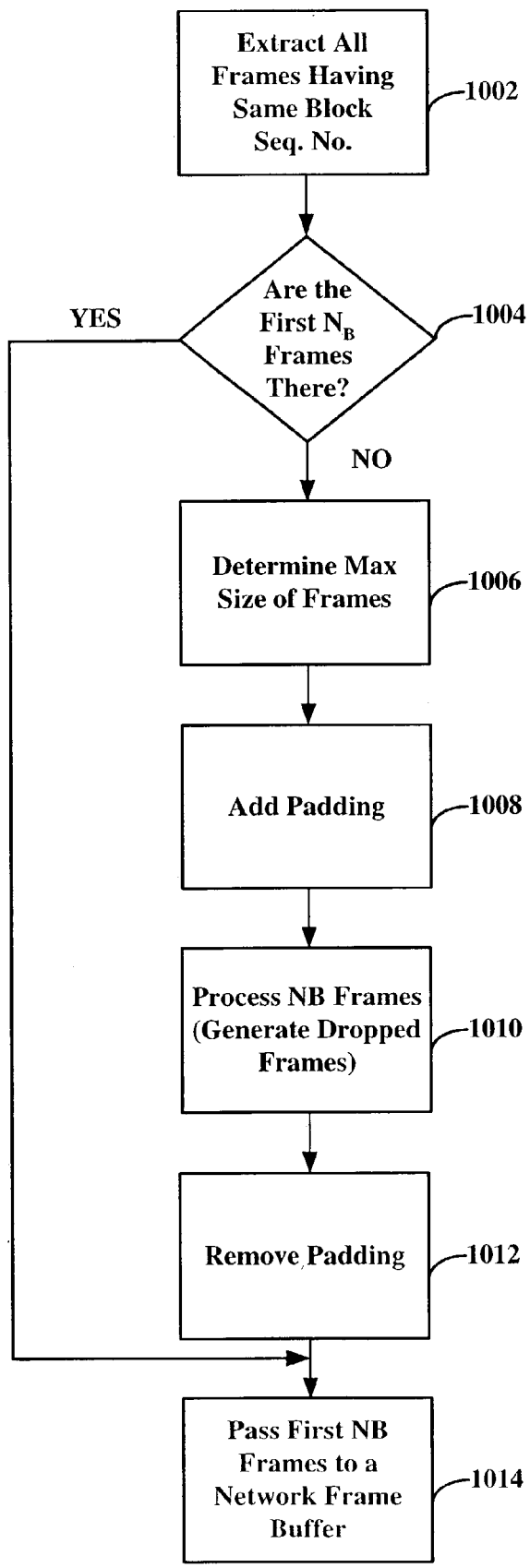
FIG. 10 is a flow chart for logic implemented by a forward error corrector module.

The FEC decoder implements the steps illustrated in FIG. 10. In step 1002, the FEC decoder 716 extracts all network frames from the FEC buffer 728 that have the same block sequence number. In step 1004, the FEC decoder module 716 then determines whether all of the first $N_B$ frames of the FEC encoded block have been received, and if so, it proceeds to step 1014. When some of the $N_B$ frames are missing, the FEC decoder module 716 first determines the maximum size of the received frames, which is the size of the repair frames. In step 1008, the FEC decoder 716 adds padding to the frames that are smaller than the maximum size. Next, in step 1010, the FEC decoder 716 generates the dropped frames using as input all of the first $N_B$ frames that were not dropped and as many of the repair/replacement frames as needed such that a total of $N_B$ frames are used as input. In step 1012, the FEC decoder module 716 removes the padding from the first $N_B$ frames. The FEC decoder module 716 examines the content of the repair/replacement frames to their size and remove any padding therefrom. Then in step 1014, the FEC decoder module 716 buffers the first $N_B$ network frames including the recreated network frames of the encoded block of frames in the network frame buffer 730.

Referring back to FIG. 7, the de-encapsulator module 714 extracts network frames from the network frame buffer 730 on a first in, first out basis. The de-encapsulator module 714 de-encapsulates the packet message 302 from the network frame 202. As previously explained hereinabove, the packet message 302 includes both metadata 306 and payload 308 which can include both content packets and stream information or just stream information or just content packets. In any case, the de-encapsulator 714 processes the metadata 306 and the payload 302 such that it generates a set of transport packets. The set may include stuffing packets that were not encapsulated in the packet message 302. The transport packets of the set are sequentially arranged such that they correspond to the order in which they were received by the ASR/AST 600B. Of course, it should be remembered that if the ASR/AST 600B dropped a program, then any content packets carrying that program were restamped as stuffing packets, and consequently, the de-encapsulator generates stuffing packets for those dropped content packets. The set of transport packets are then stored sequentially in the output buffer 732.

The transport stream I/O device 608A receives transport packets from the output buffer 732 on a first-in, first-out basis and transmits the transport packets as a synchronous transport stream 136. In the preferred embodiment, the transport packet stream 136 is essentially identical to the transport packet stream 126 with the differences in the streams corresponding to dropped programs. Furthermore, in the preferred embodiment, the transmission rates of the two streams are essentially matched such that the arrival time difference between transport packets bearing two consecutive PCRs in transport packet stream 136 is essentially identical to the transmission time difference of the same two transport packets in the transport packet stream 126. However, in alternative embodiments, the operator of the STS 100 may not be concerned about jitter in the transport packet stream 136 because a de-jittering device (not shown) could receive the transport stream 136 and correct for jitter. An exemplary de-jittering device is described in U.S. Pat. No. 5,640,388, which is hereby incorporated by reference in its entirety. When the operator is not concerned about jitter, the packet messages 302 could include only content packets with no stream information. In this embodiment, the ASR/AST 600A could be adapted to insert stuffing packets in the output buffer 732 such that the output buffer 732 does not underflow. In yet another embodiment, the stream information would include stuffing density information, which would be the number of stuffing packets that are in a set of transport packets carried by a packet message 302. Thus, for example, a packet message 302 would carry the packet set 400 illustrated in FIG. 4, by encapsulating the content packets C5, C6, C11, C13, C15 and C18 and stuffing density=11. In this embodiment, the de-encapsulator module 714 reads the stuffing density information and generates 11 stuffing packets. The 11 stuffing packets are then transmitted along with the received content packets. Thus, the density of the stuffing packets in transport stream 136 is the same as the stuffing packet density in transport stream 126 except for dropped programming. Again, a de-jittering device downstream would then correct for jitter introduced by not having the content packets and the stuffing packets arranged in the proper order.

However, in one preferred embodiment, the transport packet stream 136 is not jittered by transmission between the ASR/AST 600B and the ASR/AST 600A. To accomplish this, the clock of the ASR/AST 600A, which is not shown, is synchronized such that the network frame buffer 730 does not overflow or underflow. Basically, if the network frame buffer 730 starts to overflow, the clock speed of the ASR/SAST 600A is increased to increase the transmission rate of transport packets from the ASR/AST 600A. On the other hand, if the network frame buffer 730 starts to underflow, the clock speed of the ASR/AST 600A is decreased so that the transmission rate of transport packets from the ASR/AST 600A is decreased.

In one preferred embodiment, the transport stream I/O device 608 is a J-I buffered device, where J is the number of buffers, and I is the number of transport packets per buffer. For a J-I buffered output device, the J buffers are primed with I transport packets 204 before the transport stream I/O device 608 is triggered to begin outputting transport packets at an initialized bit rate, which the configurer 710 initializes using a Configuration Message 310. For example, if the transport stream I/O device 608 is a double-buffered device with 1K transport packets per buffer (a 2-1K device), then the output is primed with 2×1K=2048 transport packets before the device is triggered to output.

The network frame buffer 730 is primed to a specified level before the transport stream I/O device 608 is triggered to output transport packets 204. The network frame buffer 730 is primed with J×I+L transport packets before these packets are forwarded to the J-I output device. The result of this is that when the transport stream I/O device 608 is triggered for output, the network frame buffer 730 will contain L transport packets.

Since the ASR/AST 600A simply plays out the transport stream 136, the only clock synchronization issue is assuring that the network frame buffer 730 does not overflow or underflow. So long as this is the case, the ASR/AST 600A can perform its function of playing out the MPEG-2 transport stream. The accuracy of the bit rate of the transport stream 136 is governed by the specification of accuracy of the ASR/AST's 600A local clock. For example, MPEG-2 specifies a local clock of 27 MHz±810 Hz (30 ppm) with a drift rate no greater than 0.075 Hz/second. The ASR/AST's 600A local clock is not synchronized to the local clock of the ASR/AST 600B nor to the local clock of the encoder 120, and if left in free-running operation, the network frame buffer 730 will eventually overflow or underflow. The following approach is taken to avert overflow and/or underflow of the network frame buffer 730: (1) calculate average buffer level of the network frame buffer 730; (2) detect when average of level of the network frame buffer 730 has changed by M transport packets (either an increase or a decrease), and estimate frequency difference between the ASR/AST 600B and ASR/AST 600A; and (c) adjust the local clock of the ASR/AST 600A to restore the buffer level of the network frame buffer 730.

After priming and initial output of the transport stream I/O device 608 and network frame buffer 730 as previously described, the network frame buffer 730 contains an initial level of L transport packets. If the local clock of the ASR/AST 600A is running faster than the local clock of the ASR/AST 600B, then the average buffer level of the network frame buffer 730 will decrease with time.

The instantaneous buffer level of the network frame buffer 730 has a considerable variance, due in part to the jitter in the arrival time of the network frames received via the BDN 130, and in part to buffered output of the transport stream I/O device 608. In one embodiment, the transport stream I/O device 608 receives and buffers multiple transport packets from the output buffer 732 at one time, which as is explained hereinbelow results in the buffer level of the network frame buffer 730 following a sawtooth pattern. Once the output buffer 732 has been filled, the processor 602 ceases processing until the transport stream I/O device 608 can accept the contents of the output buffer 732, or in other words, the software task "blocks". During this time, the de-interleaver buffer 726 continues filling up with network frames 202 from the stream of network frames 128.

When the transport stream I/O device 608 accepts the contents of the output buffer 732, the processor 602 empties the de-interleaved network frames in the de-interleaver buffer 726 into the FEC buffer 728. All of the network frames 204 in the FEC buffer 728 are FEC decoded and placed into the network frame buffer 730.

The network frame buffer 730 represents an intermediate buffer where network frames 202 are "pushed" by the ASR/AST 600B and "pulled" by the transport stream I/O device 608 of the ASR/AST 600A. The relative drift between clocks of the ASR/AST 600A and the ASR/AST 600B is estimated by detecting differences in the average level of the network frame buffer 730 over time. Because the buffer level of the network frame buffer 730 follows a sawtooth pattern, the instantaneous level of the buffer needs to be measured at the same point of the sawtooth pattern, so as to remove the effects of the sawtooth pattern on the determination of the average buffer level. If the level of the network frame buffer 730 is sampled directly after the contents of the output buffer 732 have been accepted by the transport stream I/O device 608 and FEC buffer 728 has been emptied into the network frame buffer 730, this represents a known point on the sawtooth pattern curve. A moving average of the buffer level for the network frame buffer 730 over a time period of several seconds results in an average with a variance of only a few transport packets.

For the purposes of clarity, we will represent the average buffer level of the network frame buffer 730 as ML(t), and we will represent the frequency of the local clock of the ASR/AST 600A and ASR/AST 600B as $f_r(t)$ and $f_r(t)$, respectively.

When $f_r(t)=f_r(t)$ for all t, that is, the local clocks of the ASR/AST 600A and ASR/AST 600B are locked, then ML(t) will be constant with time, since the push rate and the pull rate are synchronized. However, when the clocks are not synchronized, then ML(t) will vary with time.

We define a threshold, $N_t$, and if, the ABS(ML($t_2$)−ML($t_1$))≧$N_t$, where ABS(x) takes the absolute value of x, then we adjust the local clock of the ASR/AST 600A. This threshold represents a decrease or increase of the level of the network frame buffer 730 by $N_t$ transport packets. The time period over which the level difference is detected is given by $\Delta T=t_2-t_1$.

From the time difference, the normalized relative frequency of the local clocks of the ASR/ASTs 600A is estimated by:

$$\Delta f(t_2)=(t_p/\Delta T)*\text{sign}(ML(t_2)-ML(t_1)) \quad \text{Eq (1)}$$

where $t_p$ is the amount of time it takes to transmit $N_t$ transport packets of a transport stream with a specified bit rate, so $t_p$ is a known constant, and sign( ) returns either +1 or −1 depending on whether the argument is positive or negative, respectively. So, for example, if the average buffer level of the network frame buffer 730 has decreased by $N_t$ packets, then $\Delta f$ is negative.

After the normalized relative frequency of the ASR/AST 600A is estimated according to Eq (1), the local clock for the ASR/AST 600A is updated as follows:

$$Fr(t)=Fr(t)+\Delta f(t_2) \times F_{ref}+\text{BIAS} \times [ML(t_2)-ML(0)] \quad \text{Eq(2)}$$

where BIAS is equal to a tunable constant frequency, e.g. 5 Hz, and $F_{ref}$ is equal to the reference frequency of the local clock in cycles per second. For example, the reference frequency specified by MPEG-2 is 27 MHz+810 Hz.

It should be noted that the term [ML($t_2$)−ML(0)] in Eq (2) represents the total accumulated increase/decrease in transport packets in the average level of the network frame buffer 730 since the first average was performed. The term $\Delta f(t_2) \times F_{ref}$ in Eq (2) serves to null out the relative drift of the clocks of the ASR/ASTs 600, whereas the term BIAS×[ML($t_2$)−ML(0)] serves to restore the network frame buffer 730 toward its original average level after drifting over the time period up to time $t_2$. For example, if $\Delta f(t_2)$ is zero indicating that the relative frequencies of the ASR/ASTs 600 clocks are equal, but [ML($t_2$)−ML(0)] is equal to −10, then the frequency of the local clock of the ASR/AST 600A is adjusted by −10×BIAS, which will cause the ASR/AST 600A to play out the stream more slowly, allowing the −10 accumulated drift in network frames to move towards zero.

Application of Eq (2) to the local clock of the ASR/AST 600A may be accomplished in steps to conform to the MPEG-2 specification on clock drift of 0.075 Hz/Second. Each second, the frequency is adjusted up or down by 0.075 Hz until the adjustment in Eq (2) is accomplished.

In the alternative, if the transport stream I/O device 608 does not provide for fine changes to its internal clock, but does provide for fine changes to its output bit rate, then the output bit rate can be adjusted instead of the internal clock to accomplish the same purpose.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method for transmitting selected content carried in a stream of transport packets, the method comprising the steps of:
   receiving a synchronous stream of transport packets, wherein the stream includes content packets and null packets;
   determining stream information for a set of received transport packets of the stream of transport packets;
   encapsulating content packets of the set of transport packets in a network frame; and
   transmitting the network frame and the stream information, wherein the network frame is transmitted through a packet switch network.

2. The method of claim 1, wherein the stream information is included in the network frame.

3. The method of claim 1, wherein the stream information indicates the number of null packets included in the set of packets.

4. The method of claim 1, wherein the stream information includes sequence information for the set of packets.

5. The method of claim 1, wherein the set of transport packets includes a predetermined number of content packets.

6. The method of claim 5, wherein the set of transport packets includes a variable number of null packets.

7. The method of claim 1, further including the steps of:
   buffering received content packets in a buffer;
   determining whether the number of content packets in the buffer exceeds or is equal to a predetermined number, K;
   responsive to the number of content packets in the buffer being equal to or greater than the predetermined number, K, defining the set of transport packets as the K first-in buffered transport packets; and
   extracting the set of transport packets from the buffer, wherein the set of transport packets are extracted on a first-in first-out basis.

8. The method of claim 7, prior to the step of extracting, further including the steps of:
   measuring the buffer time ($T_B$) of the first-in transport packet;
   responsive to the buffer time ($T_B$) of the first-in transport packet being greater than or equal to a predetermined time, T, defining the set of transport packets to include the first-in buffered transport packet.

9. The method of claim 7, prior to the step of extracting, further including the steps of:
   measuring the buffer level of the buffer;
   responsive to the buffer level exceeding a pre-determined threshold, defining the set of transport packets to include the first-in buffered transport packet.

10. The method of claim 1, further including the steps of:
    buffering the network frame in a buffer, wherein the buffer has a plurality of network frames stored therein;
    extracting a first set of network frames from the buffer, wherein the network frames are extracted in a first-in first-out basis;
    providing the first set of network frames to a forward-error-encoder to generate replacement network frames;
    defining a group of network frames as being the first set of network frames and the replacement network frames; and
    providing the group of network frames to a transmitter for transmission therefrom.

11. The method of claim 10, prior to the step of providing the group of network frames to the transmitter, further including the steps of:
    buffering the group of network frames in a second buffer, wherein the second buffer has multiple groups of network frames including a second group of network frames stored therein;
    interleaving the first group of network frames with the second group of network frames, wherein the network frames of the first and second groups of network frames are provided to the transmitter in interleaved order.

12. The method of claim 11, wherein the first group of network frames is interleaved with a plurality of groups of network frames, and wherein the network frames of the interleaved groups are provided to the transmitter in interleaved order.

13. The method of claim 10, prior to the step of providing the first set of network frames to the forward-error-encoder, further including the steps of:
    determining a largest network frame size for the first set of network frames; and
    responsive to a given network frame of the first set of network frames being smaller than the largest network frame size, adding a specific amount of padding to the given network frame such that the size of the given network frame with the padding is equal to the largest network frame size.

14. The method of claim 13, prior to the step of defining the group of network frames, further including the step of:
    removing the padding from each given network frame of the first set of network frames.

15. The method of claim 1, wherein the stream of transport packets includes a plurality of elementary streams and a stream of null packets, wherein each elementary stream and the stream of null packets have a unique packet identifier associated therewith, the method further including the steps of:
    identifying a particular elementary stream of the plurality of elementary streams; and
    processing the packets of the particular elementary stream as null packets.

16. The method of claim 1, wherein the step of determining stream information further includes the steps of:
    counting the number of null packets interposing a pair of consecutively received content packets;
    associating the null packet count with one content packet of the pair of consecutively received content packets; and
    including the null packet count in the stream information.

17. The method of claim 16, further including the step of:
    interleaving the stream information for a set of transport packets with the content packets of the set of transport packets.

18. The method of claim 1, wherein the transport stream is an MPEG transport stream and the null packets are stuffing packets.

19. A method of transmitting selected content carried in a stream of transport packets, the method comprising the steps of:
- buffering transport packets of a synchronous stream of transport packets in a buffer, wherein the stream consists of content packets and null packets;
- extracting sets of packets from the buffer according to a first-in, first-out basis, wherein each set includes multiple transport packets, each set having none or more content packets and none or more null packets;
- responsive to a given set of packets having one or more content packets and having one or more null packets, encapsulating a portion of the set of packets in a network frame, wherein only the one or more content packets of the set of packets are encapsulated; and
- transmitting a stream network frames carrying the content packets of the stream of transport packets.

20. The method of claim 19, further including the steps of:
- determining for each set of packets stream information, wherein the stream information indicates the proportion of null packets for that set of packets; and
- transmitting the stream information.

21. The method of claim 20, further including the steps of:
- responsive to a second given set of packets consisting of only null packets, encapsulating the stream information of the second given set of packets in a second network frame; and
- transmitting the second network frame.

22. The method of claim 20, wherein for a given set of transport packets the stream information defines the order of the multiple packets for that given set.

23. The method of claim 19, wherein the null packets of the stream of transport packets are not encapsulated in the network frames carrying the content packets.

24. The method of claim 20, further including the step of:
- calculating the bit rate of the received transport stream;
- generating a configuration message having the bit rate included therein; and
- transmitting the configuration.

25. An apparatus for transmitting selected content carried in a stream of transport packets, the apparatus comprising:
- an input port adapted to receive a synchronous stream of transport packets, wherein the stream includes content packets and null packets;
- a buffer in communication with the input port adapted to store the received transport packets;
- a processor in communication with the buffer adapted to determine stream information for a set of the stored received transport packets and adapted to encapsulate content packets of the set of transport packets in a network frame; and
- a transmitter in communication with the processor adapted to transmit the network frame and the stream information.

26. The apparatus of claim 25, wherein the stream information is included in the network frame.

27. The apparatus of claim 25, wherein the stream information indicates the number of null packets included in the set of packets.

28. The apparatus of claim 25, wherein the stream information includes sequence information for the set of packets.

29. The apparatus of claim 25, wherein the set of transport packets includes a predetermined number of content packets.

30. The apparatus of claim 29, wherein the set of transport packets includes a variable number of null packets.

31. The apparatus of claim 25, wherein the transport packets of the received stream of transport packets stored in the buffer include content packets, wherein the processor is further adapted to determining whether the number of content packets in the buffer exceeds or is equal to a predetermined number, K, and responsive to the number of content packets in the buffer being equal to or greater than the predetermined number, K, the processor defines the set of transport packets as the K first-in buffered transport packets and wherein the process is further adapted to extract the set of transport packets from the buffer, wherein the set of transport packets are extracted on a first-in first-out basis.

32. The apparatus of claim 31, wherein the processor is further adapted to measure the buffer time ($T_B$) of the first-in transport packet, and responsive to the buffer time ($T_B$) of the first-in transport packet being greater than or equal to a predetermined time, T, the processor defines the set of transport packets to include the first-in buffered transport packet.

33. The apparatus of claim 31, wherein the processor is further adapted to measure the buffer level of the buffer, and responsive to the buffer level exceeding a pre-determined threshold, define the set of transport packets to include the first-in buffered transport packet.

34. The apparatus of claim 25, further including:
- a second buffer having a plurality of network frames stored therein; and
- a forward-error-correction module adapted to extract a set of network frames from the second buffer and encode the set of network frames to generate at least one replacement frame, wherein the transmitter transmits the set of network frames and the at least one replacement frame.

35. The apparatus of claim 34, further including:
- a third buffer having a plurality of groups of network frames stored therein, wherein each group of network frames is defined as an encoded set of network frames and the at least one replacement network frame for that set; and
- an interleaver module adapted to interleave multiple groups of network frames together, wherein the network frames of the multiple groups of network frames are provided to the transmitter in interleaved order.

36. The apparatus of claim 34, wherein the forward-error-correction module is adapted to determine a largest network frame size for the set of network frames, and responsive to a given network frame of the set of network frames being smaller than the largest network frame size, the forward-error-corrector is adapted to add a specific amount of padding to the given network frame such that the size of the given network frame with the padding is equal to the largest network frame size.

37. The apparatus of claim 36, wherein the forward-error-corrector module is further adapted to remove the padding from each given network frame of the set of network frames responsive to generating the at least one replacement frame.

38. The apparatus of claim 25, wherein the stream of transport packets includes of a plurality of elementary streams and a stream of null packets, wherein each elementary stream and the stream of null packets have a unique packet identifier associated therewith, wherein the processor is further adapted to identify a particular elementary stream of the plurality of elementary streams and adapted to associate the null packet identifier with the packets of the particular elementary stream.

39. The apparatus of claim 25, wherein the stream information includes the number of null packets interposing a pair of consecutively received content packets.

40. The apparatus of claim 25, wherein processor is further adapted to interleave the stream information for a given set of transport packets with the content packets of the given set of transport packets.

41. The apparatus of claim 25, wherein the transport stream is an MPEG transport stream and the null packets are stuffing packets.

42. An apparatus for transmitting selected content carried in a stream of transport packets, the apparatus comprising:
  a buffer adapted to buffer transport packets of a synchronous stream of transport packets, wherein the stream consists of content packets and null packets;
  a processor in communication with the buffer adapted to extract sets of packets from the buffer according to a first-in, first-out basis, wherein each set includes multiple transport packets, each set having none or more content packets and none or more null packets;
  an encapsulator module adapted to encapsulate a given set of packets having one or more content packets and having one or more null packets in a network frame, wherein only the one or more content packets of the set of packets are encapsulated; and
  a transmitter adapted to transmit an asynchronous a stream network frames carrying the content packets of the stream of transport packets.

43. The apparatus of claim 42, wherein the processor is further adapted to determine stream information for each set of packets and include the stream information in a message, wherein the stream information indicates the proportion of null packets for that set of packets and the message having the stream information is transmitted.

44. The apparatus of claim 43, wherein the encapsulator is further adapted to encapsulate the stream information of a second given set of packets in a second network frame, wherein the second given set of packets consists of only null packets, and wherein the transmitter transmits the second given network frame.

45. The apparatus of claim 43, wherein for a given set of transport packets the stream information defines the order of the multiple packets for that given set.

46. The apparatus of claim 42, wherein the null packets of the stream of transport packets are not encapsulated in the network frames carrying the content packets.

47. The apparatus of claim 43, wherein the processor is further adapted to calculate the bit rate of the received transport stream and generate a configuration message having the bit rate included therein.

* * * * *